(12) United States Patent
Schmidt

(10) Patent No.: US 10,713,481 B2
(45) Date of Patent: Jul. 14, 2020

(54) DOCUMENT EXTRACTION SYSTEM AND METHOD

(71) Applicant: CROWE LLP

(72) Inventor: Jeffrey R. Schmidt, Brentwood, TN (US)

(73) Assignee: CROWE HORWATH LLP, Oak Brook, IL (US)

( * ) Notice: Subject to any disclaimer, the term of this patent is extended or adjusted under 35 U.S.C. 154(b) by 0 days.

(21) Appl. No.: 15/728,686

(22) Filed: Oct. 10, 2017

(65) Prior Publication Data

US 2018/0101725 A1     Apr. 12, 2018

Related U.S. Application Data

(60) Provisional application No. 62/406,553, filed on Oct. 11, 2016.

(51) Int. Cl.
*G06K 9/00* (2006.01)
*G06F 16/93* (2019.01)
(Continued)

(52) U.S. Cl.
CPC ....... *G06K 9/00449* (2013.01); *G06F 16/334* (2019.01); *G06F 16/93* (2019.01); *G06K 9/00469* (2013.01); *G06K 9/00456* (2013.01); *G06K 9/6201* (2013.01); *G06K 2209/01* (2013.01)

(58) Field of Classification Search
CPC .......... G06K 9/00449; G06K 9/00469; G06K 9/00456; G06K 2209/01; G06K 9/6201; G06F 16/334; G06F 16/93
See application file for complete search history.

(56) References Cited

U.S. PATENT DOCUMENTS 7,139,752 B2    11/2006    Broder et al.
7,590,647 B2     9/2009    Alam et al.
(Continued)

OTHER PUBLICATIONS

Hassan Alam; Document Title: Automated Financial Data Extraction—An AI Approach; http://worldcomp-proceedings.com/proc/p2013/ICA3471.pdf; Date of Publication: May 31, 2013.
(Continued)

*Primary Examiner* — John W Lee
(74) *Attorney, Agent, or Firm* — Barnes & Thornburg LLP

(57) ABSTRACT

A system for giving meaning to data in a non-standardized digital document. In some embodiments, the system includes a web portal, a recognition server and an extraction system. The web portal is accessible via a network for receiving a non-standardized digital source document. The recognition server is configured to perform optical character recognition analysis on the non-standardized digital source document and generates document recognition data including positional locations of a plurality of characters in the non-standardized digital source document. The extraction system is configured to identify labels and corresponding values represented in the non-standardized digital source document and automatically maps the labels to a plurality of predetermined variables in an external software system to which the values from the non-standardized digital source document are to be imported.

16 Claims, 9 Drawing Sheets

(51) Int. Cl.
  *G06F 16/33*     (2019.01)
  *G06K 9/62*      (2006.01)

(56) References Cited

U.S. PATENT DOCUMENTS

| | | |
|---|---|---|
| 9,292,579 B2 | 3/2016 | Madhani et al. |
| 2004/0194009 A1 | 9/2004 | LaComb et al. |
| 2005/0125746 A1* | 6/2005 | Viola ..................... G06F 16/93 715/853 |
| 2012/0203676 A1 | 8/2012 | Chou |
| 2015/0066895 A1 | 3/2015 | Komissarchik et al. |
| 2016/0063322 A1* | 3/2016 | Dejean ............... G06K 9/00449 382/176 |

OTHER PUBLICATIONS

Cvision; Document Title: OCR Applications; http://www.cvisiontech.com/reference/general-information/ocr-applications.html; Date of Publication: 2011.

* cited by examiner

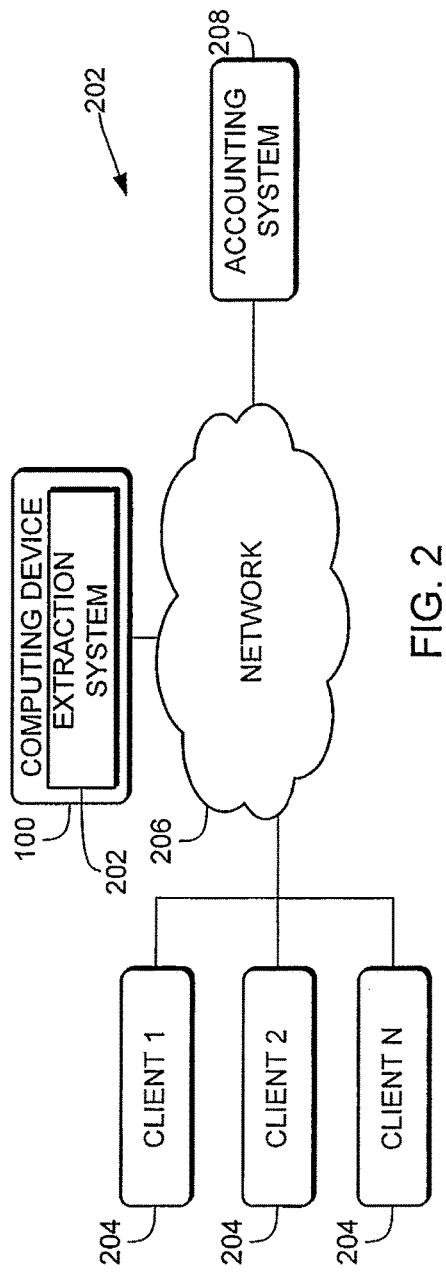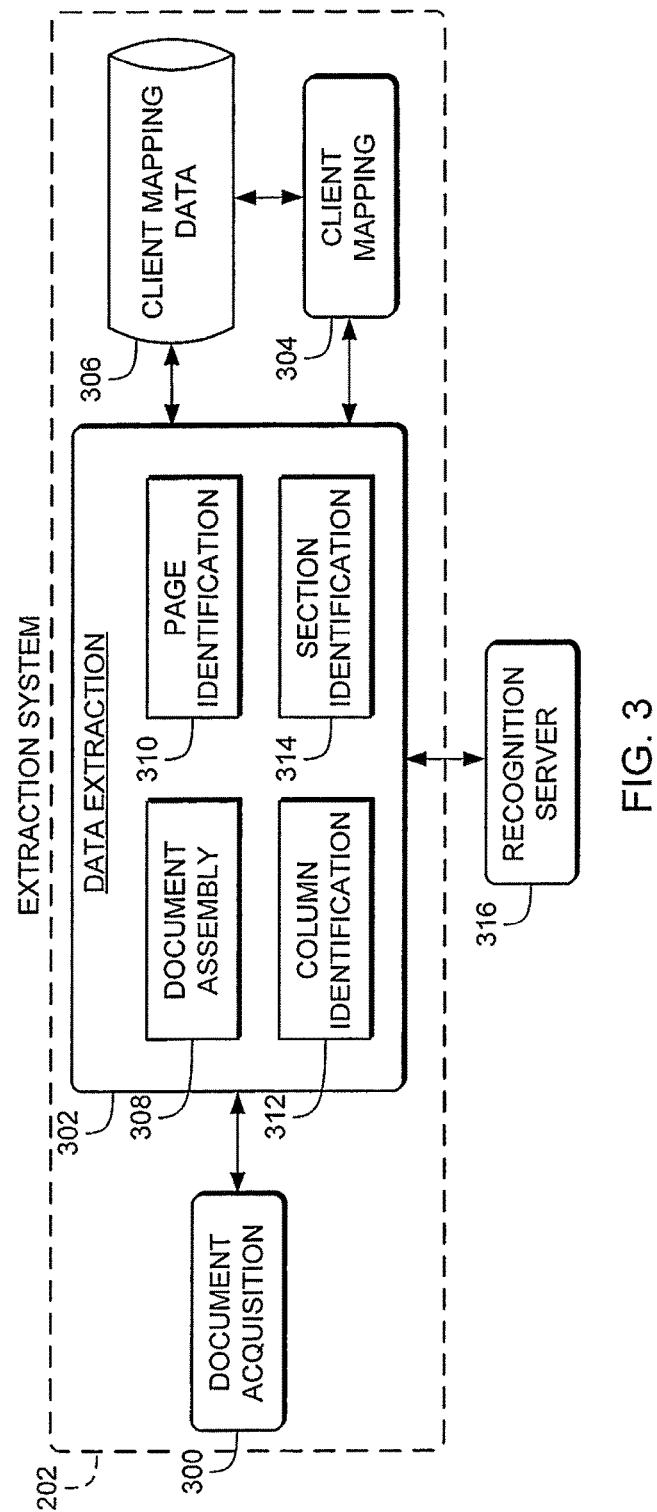

COMBINED BALANCE SHEETS (UNAUDITED)
*(In thousands of dollars)*

|  | March 31 2013 (Unaudited) |
|---|---:|
| ASSETS | |
| CURRENT ASSETS | |
| Cash and cash equivalents | $ 272,901 |
| Marketable securities | 45,902 |
| Assets whose use is limited: | |
|    Board-designated | 99 |
|    Held by trustees | 51,555 |
|    Donor-restricted | |
| Patient accounts receivable, net of allowance for uncollectible accounts | 376,098 |
| Receivables from third-party payors | 32,080 |
| Other receivables | 32,049 |
| Inventories | 43,826 |
| Prepaid expenses and other current assets | 32,780 |
| TOTAL CURRENT ASSETS | 887.290 |
| OTHER ASSETS | |
| Notes receivable | 18,217 |
| Marketable securities | 455,738 |
| Assets whose use is limited: | |
|    Board-designated | 115,322 |
|    Held by trustees | 299,901 |
|    Donor-restricted | 19,984 |
| Long-term investments | 20,141 |
| Deferred financing costs | 8,282 |
| Other-long-term assets | 56,884 |
| TOTAL OTHER ASSETS | 994,469 |
| PROPERTY AND EQUIPMENT, net | 1,499,964 |
| TOTAL ASSETS | $ 3,381,723 |

*FIG. 7*

|  | column 1 | column 2 |
|---|---|---|
| row 1 | COMBINED BALANCE SHEETS (UNAUDITED) | |
| row 2 | (In thousands of dollars) | |
| row 3 | ▢ | |
| row 4 | | March 31 |
| row 5 | | 2013 |
| row 6 | | (Unaudited) |
| row 7 | ASSETS | |
| row 8 | CURRENT ASSETS | |
| row 9 | Cash and cash equivalents | $ 272,901 |
| row 10 | Marketable securities | 45,902 |
| row 11 | Assets whose use is limited: | |
| row 12 | Board-designated | 99 |
| row 13 | Held by trustees | 51,555 |
| row 14 | Donor-restricted | |
| row 15 | Patient accounts receivable, net of | |
| row 16 | allowance for uncollectible accounts | 376,098 |
| row 17 | Receivables from third-party payors | 32,080 |
| row 18 | Other receivables | 32,049 |
| row 19 | Inventories | 43,826 |
| row 20 | Prepaid expenses and other current assets | 32,780 |
| row 21 | TOTAL CURRENT ASSETS | 887,290 |
| row 22 | OTHER ASSETS | |
| row 23 | Notes receivables | 18,217 |
| row 24 | Marketable securities | 455,738 |
| row 25 | Assets whose use is limited: | |
| row 26 | Board-designated | 115,322 |
| row 27 | Held by trustees | 299,901 |
| row 28 | Donor-restricted | 19,984 |
| row 29 | Long-term investments | 20,141 |
| row 30 | Deferred financing costs | 8,282 |
| row 31 | Other long-term assets | 56,884 |
| row 32 | TOTAL OTHER ASSETS | 999,469 |
| row 33 | PROPERTY AND EQUIPMENT, net | 1,499,964 |
| row 34 | TOTAL ASSETS | $ 3,381,723 |

*FIG. 8*

| Balance Sheet | Income Statement |
|---|---|
| Assets | Revenue |
|   Current Assets | Total Revenue |
|   Other Assets | Sales Expenses |
| Total Assets | Total Sales Expenses |
| Liabilities | Operating Expenses |
| | Total Operating Expenses |

FIG. 9

| Source Document | | Export Template Result | |
|---|---|---|---|
| Label | Value | Line Item | Value |
| Cash and cash equivalents | 272,901 | Cash | 318,803 |
| Marketable securities | 45,902 | | |

FIG. 10

DOCUMENT EXTRACTION SYSTEM AND METHOD

RELATED APPLICATIONS

This application claims the benefit of U.S. Provisional Application Ser. No. 62/406,553 filed Oct. 11, 2016, for a "Document Extraction System and Method," which is hereby incorporated by reference in its entirety.

TECHNICAL FIELD

This disclosure relates generally to the technical problem of extracting data from non-standardized digital scans of documents; in particular, this disclosure relates to an electronic system with specialized interpreter software that solves this technical problem by interpreting non-standardized financial documents in a manner that gives meaning to the data for integration into third party systems.

BACKGROUND AND SUMMARY

Some digital documents are natively electronic while others originate as paper documents that were digitized. For example, some electronic documents are created by scanning paper documents. Unlike native documents, scanned documents are typically an image file, which is essentially a photo of the paper document.

Optical character recognition ("OCR") can be used to convert the image file of the document into machine-encoded text. The resulting file is merely the translation of characters from the image file, but does not provide any meaning of the characters in the file. For example, the OCR file may have converted the characters "assets" and "$1,000," but there will be no relationship created between this data in which the variable "assets" is assigned a value of "1,000."

Determining the meaning of data in an OCR file can be important. For example, the meaning may be needed for importation of the data into a third party software system. With such an import, determining where values are positioned for which variables can be difficult. Typically, the document must be mapped to establish the locations of the values for each variable needed in the import. This type of mapping can be time consuming and costly. In cases where the documents are in a standardized format, such as a standard form, each form can be mapped and used to extract data from multiple documents having that standardized format. With non-standardized documents, however, the mapping of each document is generally not feasible because the location of values and variables is unexpected.

This disclosure relates to an automated solution for extracting this data from non-standardized financial documents (e.g., balance sheets, income statements, etc.) for import into financial software systems. The system includes a portal that allows a financial institution's customers to submit financial documents. The system allows a software subscriber to setup recurring mapping rules based upon the contents of the submitted statements, apply these mapping rules to statements each time they are submitted, and produce an extract of data formatted for integration into financial institutions' internal systems. Since this process is automated, the system creates an audit trail each step of the way to provide compliance-oriented monitoring over the data flow from their end-customer into the financial institution.

The system uses existing OCR technologies to map the contents of financial documents' pages. However, this map is consumed by the system with a custom interpreter that makes assumptions based on the fact that the scanned documents are financial statements that typically have some common formatting features. These assumptions allow the system to make sense of financial statements and extract the data properly without an extensive OCR mapping process that is common in OCR scenarios. In other words, the system can make sense of the OCR'ed data to assign certain numbers to variables for export and allows data to be extracted from these statements the first time it is submitted without an expensive one-time effort to setup a specific template for the statement which allows the system to read it with conventional OCR interpreter technologies.

BRIEF DESCRIPTION OF THE DRAWINGS

The detailed description makes reference to the accompanying figures in which:

FIG. 2 is a diagrammatic view of an example extraction system according to one embodiment;

FIG. 3 is a diagrammatic view of an example computing device in which the extraction system could operate according to one embodiment;

FIG. 7 is a source document, which is a balance sheet in this example, that could be received by the extraction system for extraction;

FIG. 8 is the example balance sheet shown in FIG. 7 overlaid with an electronic document structure;

FIG. 9 is a table showing example sections and headings that were extracted from the example balance sheet of FIG. 7 by the extraction system; and FIG. 10 is a table showing example data mapping of certain values from the balance sheet of FIG. 7 that were extracted by the extraction system.

DETAILED DESCRIPTION OF THE DRAWINGS

Figure 1:
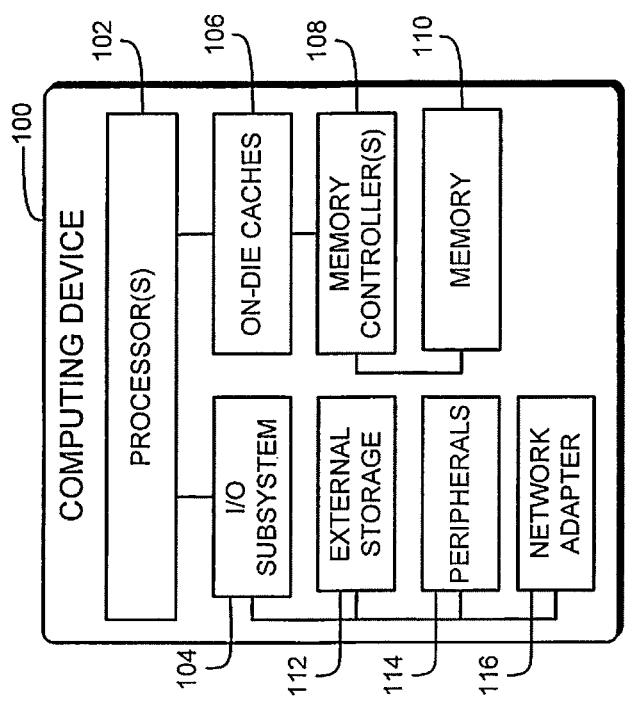
FIG. 1 is a diagrammatic view of an example computing environment in which the extraction system could operate according to one embodiment.

The figures and descriptions provided herein may have been simplified to illustrate aspects that are relevant for a clear understanding of the herein described devices, systems, and methods, while eliminating, for the purpose of clarity, other aspects that may be found in typical devices, systems, and methods. Those of ordinary skill may recognize that other elements and/or operations may be desirable and/or necessary to implement the devices, systems, and methods described herein. Because such elements and operations are well known in the art, and because they do not facilitate a better understanding of the present disclosure, a discussion of such elements and operations may not be provided herein. However, the present disclosure is deemed to inherently include all such elements, variations, and modifications to the described aspects that would be known to those of ordinary skill in the art.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The detailed description which follows is presented in part in terms of algorithms and symbolic representations of operations on data bits within a computer memory representing alphanumeric characters or other information. An algorithm is provided by this disclosure and is generally conceived to be a self-consistent sequence of steps leading to a desired result. These steps are those requiring physical manipulations of physical quantities. Usually, though not necessarily, these quantities take the form of electrical or magnetic pulses or signals capable of being stored, transferred, transformed, combined, compared, and otherwise manipulated. It proves convenient at times, principally for reasons of common usage, to refer to these signals as bits, values, symbols, characters, display data, terms, numbers, or the like as a reference to the physical items or manifestations in which such signals are embodied or expressed. It should be borne in mind, however, that all of these and similar terms are to be associated with the appropriate physical quantities and are merely used here as convenient labels applied to these quantities.

Some algorithms may use data structures for both inputting information and producing the desired result. Data structures greatly facilitate data management by data processing systems, and are not accessible except through sophisticated software systems. Data structures are not the information content of a memory, rather they represent specific electronic structural elements which impart or manifest a physical organization on the information stored in memory. More than mere abstraction, the data structures are specific electrical or magnetic structural elements in memory which simultaneously represent complex data accurately, often data modeling physical characteristics of related items, and provide increased efficiency in computer operation.

Further, the manipulations performed are often referred to in terms, such as comparing or adding, commonly associated with mental operations performed by a human operator. No such capability of a human operator is necessary, or desirable in most cases, in any of the operations described herein which form part of the present invention; the operations are machine operations. Useful machines for performing the operations of the present invention include general purpose digital computers or other similar devices. In all cases the distinction between the method operations in operating a computer and the method of computation itself should be recognized. A method and apparatus are disclosed for operating a computer in processing electrical or other (e.g., mechanical, chemical) physical signals to generate other desired physical manifestations or signals. The computer operates on software modules, which are collections of signals stored on a media that represents a series of machine instructions that enable the computer processor to perform the machine instructions that implement the algorithmic steps. Such machine instructions may be the actual computer code the processor interprets to implement the instructions, or alternatively may be a higher level coding of the instructions that is interpreted to obtain the actual computer code. The software module may also include a hardware component, wherein some aspects of the algorithm are performed by the circuitry itself, rather as a result of an instruction. The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

An apparatus is disclosed for performing these operations. This apparatus may be specifically constructed for the required purposes, or it may comprise a general purpose computer as selectively activated or reconfigured by a computer program stored in the computer. The algorithms presented herein are not inherently related to any particular computer or other apparatus unless explicitly indicated as requiring particular hardware. In some cases, the computer programs may communicate or relate to other programs or equipment through signals configured to particular protocols which may or may not require specific hardware or programming to interact. In particular, various general purpose machines may be used with programs written in accordance with the teachings herein, or it may prove more convenient to construct more specialized apparatus to perform the required method steps. The required structure for a variety of these machines will appear from the description below.

In the following description several terms which are used frequently have specialized meanings in the present context. The term "network" means two or more computers which are connected in such a manner that messages may be transmitted between the computers. In such computer networks, typically one or more computers operate as a "server," a computer with large storage devices such as hard disk drives and communication hardware to operate peripheral devices such as printers or modems. The term "browser" refers to a program which is not necessarily apparent to the user, but which is responsible for transmitting messages between the user's computer and the network server and for displaying and interacting with network resources.

Browsers are designed to utilize a communications protocol for transmission of text and graphic information over a worldwide network of computers, namely the "World Wide Web" or simply the "Web." Examples of browsers compatible with the present invention include the Internet Explorer browser program offered by Microsoft Corporation (Internet Explorer is a trademark of Microsoft Corporation), the Chrome browser program offered by Google Inc. (Chrome is a trademark of Google Inc.), the Safari browser program offered by Apple Inc. (Safari is a trademark of Apple Inc.) or the Firefox browser program distributed by the Mozilla Foundation (Firefox is a registered trademark of the Mozilla Foundation). The browser could operate on a desktop operating system, such as Windows by Microsoft Corporation (Windows is a trademark of Microsoft Corporation) or OS X by Apple Inc. (OS X is a trademark of Apple Inc.). In some cases, the browser could operate on mobile operating systems, such as iOS by Apple Inc. (iOS is a trademark of Apple Inc.) or Android by Google Inc. (Android is a trademark of Google Inc.). Browsers display information which is formatted in a Standard Generalized Markup Language ("SGML") or a Hyper Text Markup Language ("HTML"), both being scripting languages which embed non-visual codes in a text document through the use of special ASCII text codes. Files in these formats may be easily transmitted across computer networks, including global information networks like the Internet, and allow the browsers to display text, images, and play audio and video recordings.

Referring now to FIG. 1, an illustrative computing device 100 for extracting data from a source document, includes at least one processor 102, an I/O subsystem 104, at least one on-die cache 106, and a memory controller 108 to control a memory 110. The computing device 100 may be embodied as any type of device capable of performing the functions described herein. For example, the computing device 100 may be embodied as, without limitation, a computer, a workstation, a server computer, a laptop computer, a notebook computer, a tablet computer, a smartphone, a mobile computing device, a desktop computer, a distributed computing system, a multiprocessor system, a consumer electronic device, a smart appliance, and/or any other computing device capable of analyzing software code segments.

As shown in FIG. 1, the illustrative computing device 100 includes the processor 102, the I/O subsystem 104, the on-die cache 106, and the memory controller 108 to control a memory 110. Of course, the computing device 100 may include other or additional components, such as those commonly found in a workstation (e.g., various input/output devices), in other embodiments. For example, the computing device 100 may include an external storage 112, peripherals 114, and/or a network adapter 116. Additionally, in some embodiments, one or more of the illustrative components may be incorporated in, or otherwise form a portion of, another component. For example, the memory 110 or portions thereof, may be incorporated in the processor 102 in some embodiments.

The processor 102 may be embodied as any type of processor capable of performing the functions described herein. For example, the processor may be embodied as a single or multi-core processor(s), digital signal processor, microcontroller, or other processor or processing/controlling circuit. The memory 110 may be embodied as any type of volatile memory and/or persistent memory capable of performing the functions described herein. In operation, the memory 110 may store various data and software used during operation of the computing device 100 such as operating systems, applications, programs, libraries, and drivers. The memory 110 is communicatively coupled to the processor 102 via the memory bus using memory controller(s) 108, which may be embodied as circuitry and/or components to facilitate input/output operations with the processor 102, the memory 110, and other components of the computing device 100.

The I/O subsystem 104 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 104 may form a portion of a system-on-a-chip (SoC) and be incorporated, along with the processor 102, the memory 110, and other components of the computing device 100, on a single integrated circuit chip.

An external storage device 112 is coupled to the processor 102 with the I/O subsystem 104. The external storage device 112 may be embodied as any type of device or devices configured for short-term or long-term storage of data such as, for example, memory devices and circuits, memory cards, hard disk drives, solid-state drives, or other data storage devices.

The computing device 100 may include peripherals 114. The peripherals 114 may include any number of additional input/output devices, interface devices, and/or other peripheral devices. By way of example only, a peripheral may be a display that could be embodied as any type of display capable of displaying digital information such as a liquid crystal display (LCD), a light emitting diode (LED), a plasma display, a cathode ray tube (CRT), or other type of display device.

The computing device 100 illustratively includes a network adapter 116, which may be embodied as any communication circuit, device, or collection thereof, capable of enabling communications between the computing device 100 and other remote devices over a computer network (not shown). The network adapter 116 may be configured to use any one or more communication technology (e.g., wired or wireless communications) and associated protocols (e.g., Ethernet, Bluetooth®, Wi-Fi®, WiMAX, etc.) to effect such communication.

FIG. 2 is a high-level block diagram of a computing environment 200 under which the computing device 100 could operate the extraction system 202 according to one embodiment. FIG. 2 illustrates the computing device 100 and three clients 204 connected by a network 206. Only three clients 204 are shown in FIG. 2 in order to simplify and clarify the description. Likewise, a single computing device 100 is shown for purposes of simplicity, but multiple computing devices could be used to operate the extraction system 202. Embodiments of the computing environment 200 may have thousands or millions of clients 204 connected to the network 206, for example, the Internet. Users (not shown) may operate software, such as a browser, on clients 204 to both send and receive messages over network 206 via computing device 100 and its associated communications equipment and software (not shown). For example, the extraction system 202 could be accessed via computing device 100 using a browser. Typically, clients 202 would be able to access the extraction system 202 over the network 204 by entering a web address, such as an IP address, URL, or domain name (web address generally referred to as a "Destination") into browser software. In some embodiments, clients 202 could include a dedicated application that connects with the extraction system 202 instead of using a web browser. The data extracted by the extraction system 202 could be sent to an accounting system 208 via the network 206.

FIG. 3 is a block diagram showing an embodiment with various modules that may be included in the extraction system 202. In the embodiment shown, the extraction system 202 includes a document acquisition module 300, a data extraction module 302, a client mapping module 304 and a client mapping database 306. In the embodiment shown, the data extraction module 302 includes a document assembly module 308, a page identification module 310, a column identification module 312, and a section identification module 314. As shown, the extraction system 202 is configured to communicate with a recognition server 316, such as via a network. For the purposes of this specification, the term "module" includes an identifiable portion of computer code, computational or executable instructions, data, or computational object to achieve a particular function, operation, processing, or procedure. A module may be implemented in software, hardware/circuitry, or a combination of software and hardware. An identified module of executable code, for example, may comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Indeed, a module of executable code could be a single instruction, or many instructions, and may even be distributed over several different code segments, among different programs, and across several memory devices. Similarly, modules representing data may be embodied in any suitable form and organized within any suitable type of data structure. The data may be collected as a single data set, or may be distributed over different locations including over different storage devices.

The document acquisition module 300 is configured to receive a source document from a user. The source document will typically be an image of a financial document, such as a balance sheet or income statement. The source document is an electronic document that has typically been scanned in as an image and contains data, such as dates, numbers and text. FIG. 7 is an example image of a source document. As an image, the data needs to be extracted from the source document to give meaning to the data. The source documents will be non-standardized financial documents and will not come in any predefined format. The term "non-standardized" is intended broadly to mean electronic documents in which the data is not organized in a predefined manner. As discussed below, the extraction system makes assumptions during extraction based on the financial nature of the source documents that allows extraction of data without manually mapping the documents.

The source document could be submitted to the document acquisition module 300 in a variety of ways. For example, the document acquisition module 300 could include a web portal that includes an interface for a user to login and upload a source document. In some embodiments, the document acquisition module 300 could include a feature that allows a financial institution to send an email (or other electronic communication) to a customer with a link to the web portal of the document acquisition module 300 at which the customer can upload a source financial document. In some cases, the document acquisition module 300 could be configured to send communications to the customer on a periodic basis as needed and/or reminder communications to the customer on certain intervals until the necessary document(s) have been uploaded. In some cases, the web portal could be configured to guide the customer through uploading the source document. In some cases, the document acquisition module 300 may include a dashboard portion that allows access to review the status of pending submissions and communications.

Upon receiving the source document from the document acquisition module 300, the data extraction module 302 is configured to extract data from the source document to provide meaning and context. In the embodiment shown, the data extraction module 302 is in communication with a recognition server 316, which performs optical character recognition ("OCR") scanning of the source document. For example, the data extraction module 302 could be programmed to communicate with the application program interface ("API") of a third party scanning server. In such an embodiment, the source document could be sent to the recognition server 316 for OCR scanning. The recognition server 316 could return one or more files containing OCR information concerning the source document. In some cases, for example, the recognition server 316 could produce a file, such as an XML file, containing the coordinate position (e.g., top, left, right, bottom) of every character on the page. The file created by the recognition server 316 may or may not contain information organizing these elements into words and/or tables. For example, in the example source document shown in FIG. 7, the "A" in "Assets" may be positioned at Top=200, Bottom=225, Left=150, Right=160. The full word could have a position at Top=200, Bottom=225, Left=150, Right=210. As shown, the recognition server 316 is external from the data extraction module 302, but in some embodiments, the recognition server 316 could be integral with the data extraction module 302.

In the embodiment shown, the data extraction module 302 includes a document assembly module 308 that is configured to ingest the file created by the recognition server 316 and cycle through the individual nodes to assemble characters into words and words into phrases. The document assembly module 308 essentially appends characters together into a word that are on the same line (i.e., having approximately the same bottom coordinate) moving from left to right (using the left position) that have a minimum number of positional pixels between the right position of the preceding character and the left position of the next character. Alternatively, if the file identifies the letters to be grouped into a word, they are accepted as a word.

Similarly, the document assembly module 308 is configured to determine that words on the same line which are positioned with less than X pixels apart are deemed to be part of a phrase. Since the source document is typically a financial statement, the assumption can often be made that words on the line constitute the row's label and numbers represent the values on the row. These phrases are then organized as columns. Columns are determined by their left and right boundary based upon the collection of values with left and right boundaries on the page. By examining the difference in the left and right values for a collection of text a textual alignment can be determined. By understanding how the text is aligned, the document assembly module 308 can then make broader assumptions on how to size the columns. For resolving small inconsistencies in column positioning, the document assembly module 308 is configured to perform statistical analysis on the individual values on a line to confirm it is positioned in the proper column. For example, this could entail comparing its midpoint (the point halfway between the left and right position) with the medians, standard deviations of the identified columns on the page itself. This process is used iteratively to position values into the proper columns starting with column 1 on the left and extending to include as many columns as are presented on the page. FIG. 8 shows the example source document in FIG. 7 after the analysis by the document assembly module 308. In the example shown, the document assembly module 308 has structured the source document into 34 rows and 2 columns.

In some embodiments, phrases and values may be "cleansed" in this process by eliminating unneeded characters such as commas in numeric values. As part of assembling this information, the confidence interval (i.e., confidence that the characters were scanned accurately) recorded by the recognition server is captured as well as the positional characteristics from the page for use as metadata in subsequent processes. Through these means, distinct pages are identified. Each page has rows. Each row has one or more columns. This structure defines the electronic document and conforms to the assumptions inherent in the tabular financial statement structure the document assembly module 308 is expecting in the submitted documents.

Figure 5A:
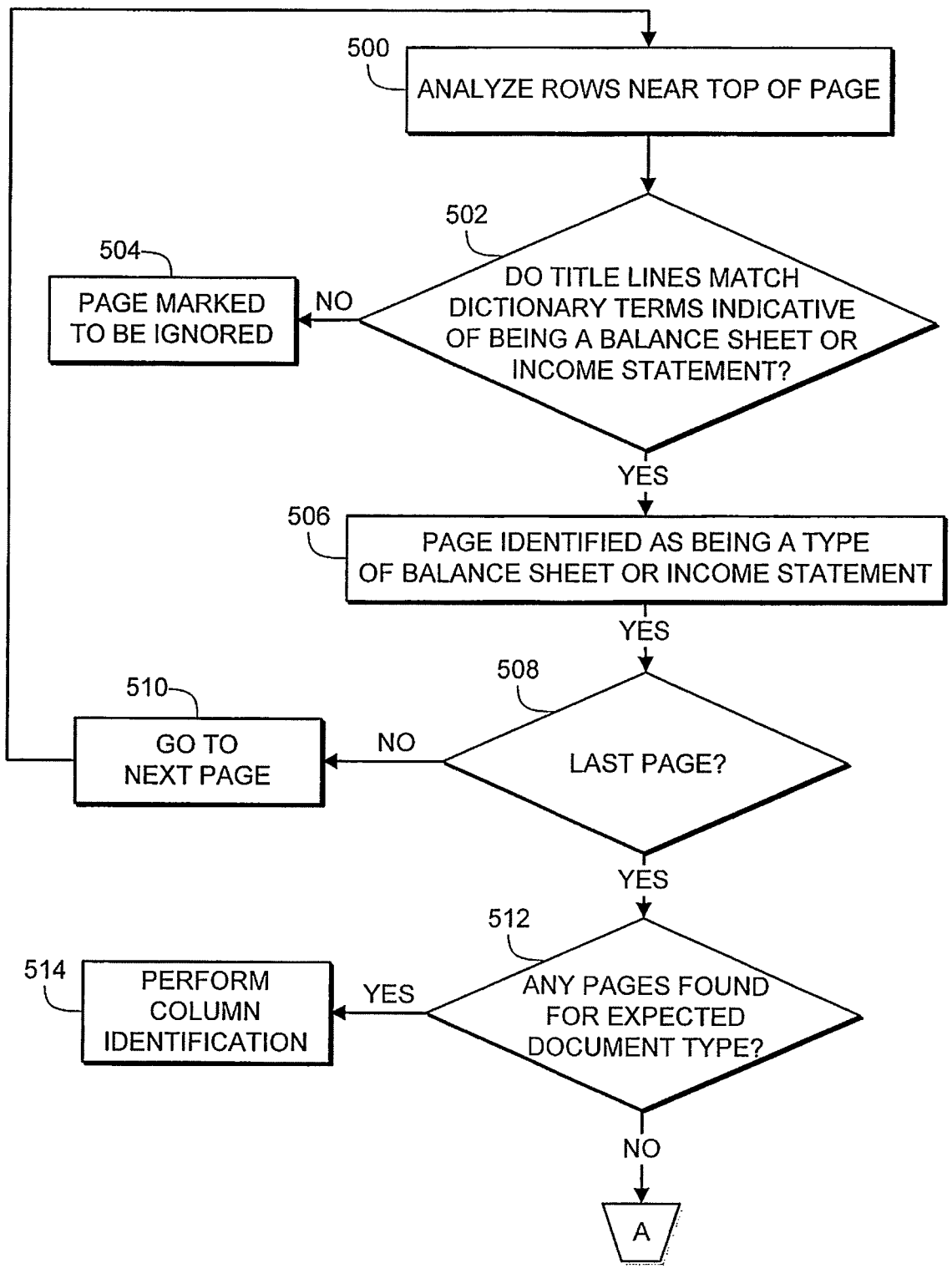
FIGS. 5A and 5B are a flow chart showing example operations for page recognition of the extraction system according to one embodiment.
Figure 5B:
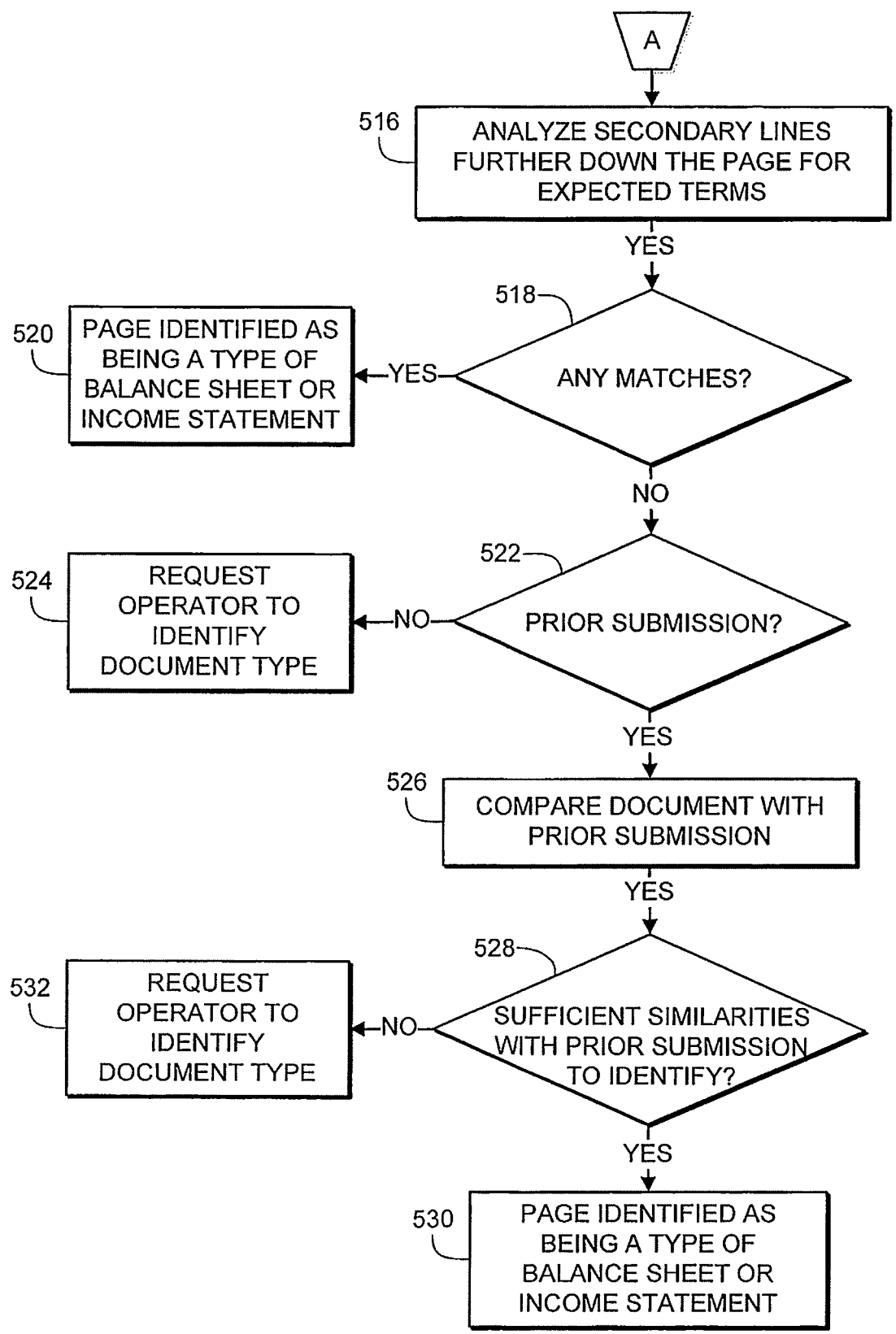

Upon giving structure to the source document using the document assembly module 308, the data extraction module 302 uses the page identification module 310 to determine pages from the source document that are required. For example, the page identification module 310 could be configured to identify which pages represent all or part of a balance sheet or an income statement. FIGS. 5A and 5B show example operations that could be performed by the page identification module 310 to identify those pages from the source document that are required according to one embodiment. In the embodiment shown, the page identification module 310 analyzes the rows near the top of the page (block 500). A determination is made whether the title lines (i.e., those without values in the first page of the page) match a dictionary of terms/synonyms indicative of a balance sheet or income statement (block 502). If the title lines do not include any terms/synonyms indicative of a balance sheet or income statement, the page is marked to be ignored (block 504). If title lines include terms/synonyms indicative of a balance sheet or income statement, the page is marked as being a type of income statement or balance sheet (block 506). The page identification module 310 next determines whether the page just analyzed is the last page in the source document (block 508). If the analyzed page is not the last page in the source document, the page identification module 310 goes to the next page and continues the process (block 510). If the analyzed page is the last page, the page identification module 310 determines whether any pages have been found in the source document for the expected document type (block 512). If there have been pages found for the expected document type, the data extraction module 302 turns to the column identification module 312 as explained below (block 514). If no pages are found for the expected document type, secondary line items further down the page are inspected for terms/synonyms (block 516). The page identification module 310 next determines whether there are secondary line items which are expected on a balance sheet or income statement, such as "Assets" or "Liabilities" (block 518). If there is a match with secondary line items, the page is identified as being a type of balance sheet or income statement (block 520). If there are no matches, the page identification module 310 analyzes whether there was a prior submission from the customer that submitted the source document (block 522). If no prior submission from the customer has previously been submitted, the page identification module 310 identifies the page as one that needs operator involvement to identify (block 524). If there is a previous submission from the customer associated with the source document, the page identification module 310 compares the source document with the prior submission (block 526) to determine whether sufficient similarities exist to identify the document type (block 528). If there are sufficient similarities with the prior submission, the page identification module 310 identifies the page as being a type of balance sheet or income statement (or other financial document type as recognized) (block 530). If there are insufficient similarities between the source document and prior submission(s), the page identification module 310 identifies the page as one that needs operator involvement to identify (block 532).

Figure 6:
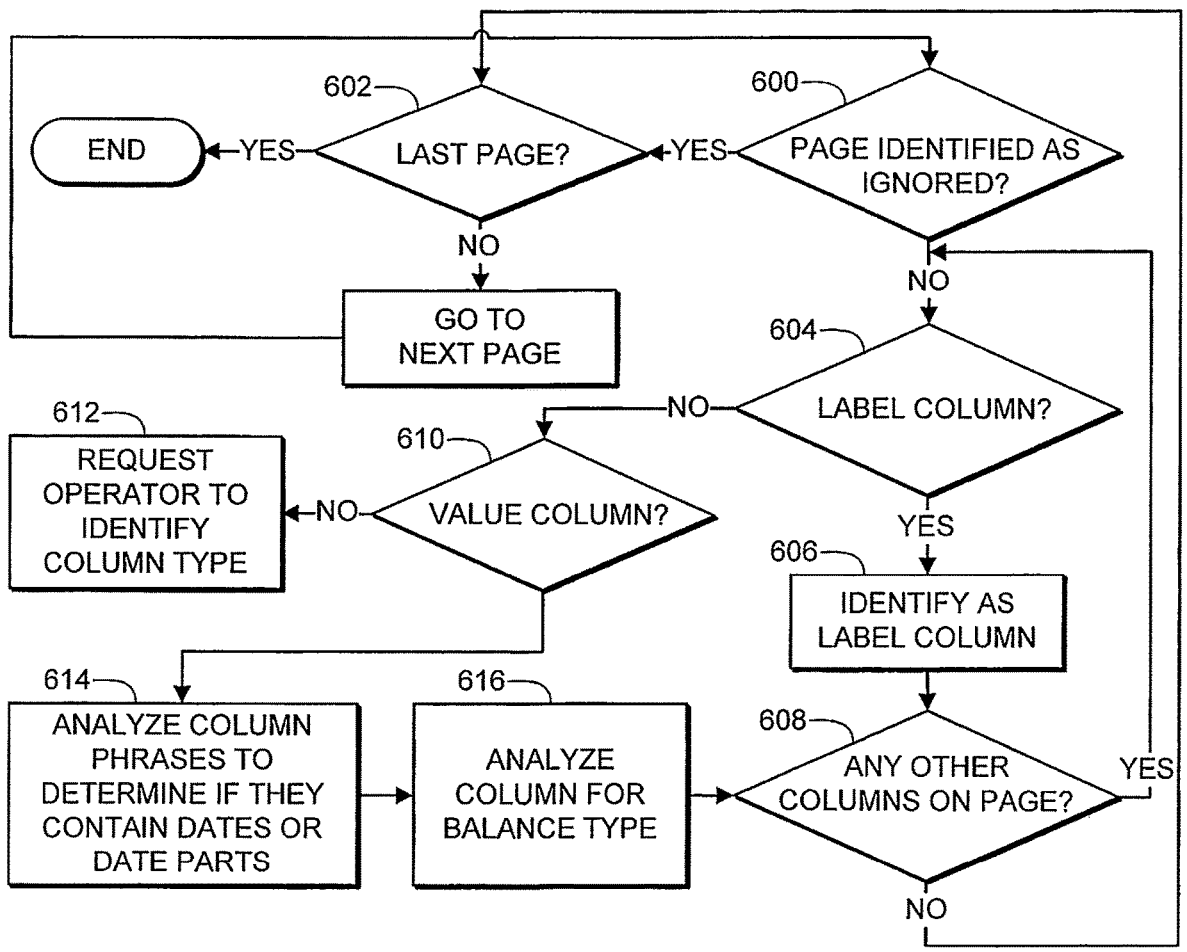
FIG. 6 is a flow chart showing example operations for column identification of the extraction system according to one embodiment.

Once the page identification module 310 identifies those pages in the source document that are useful for the data that is required, the column identification module 312 determines which columns are label columns (typically only one per page) or value columns. The term "label column" is meant to convey that FIG. 6 shows example operations that could be performed by the column identification module 310 to identify those columns that are label columns and those that are value columns according to one embodiment. Value columns are examined to determine which value column contains the expected data for the period (i.e., month/year) being loaded. As with pages, certain assumptions are made about a column. For example, one of these assumptions is that the first few values in the column represent a heading.

The column identification module 312 analyzes a page to determine whether the page identification module 310 identified the page as one that can be ignored (block 600). If the page has been marked as one to ignore, a determination is made whether that page is the last page in the source document (block 602). If this is the last page, the column identification module 312 ends its processing of the source document. If the page has not been marked as one to ignore, the column identification module 312 determines whether the column is a label column (block 604). For example, the column identification module 312 could analyze the first few rows of the column to determine the heading, and based on the text of the heading, could determine whether the column is a label column. If the column is determined to be a label column, the column identification module 312 identifies the column as a label column (block 606) and a determination is made whether any other columns are on the page (block 608). If the column is determined to not be a label column, the column identification module 312 analyzes the column to determine if it is a value column (block 610). For example, the column identification module 312 could determine the column is a value column based on the data being numbers in that column. If the column identification module 312 cannot determine whether the column is value column, the column is identified as needing an operator to identify the column type (block 612). However, if the column is identified as a value column, the column is analyzed to determine if the column phrases contain dates or date parts (block 614). For example, the column may be analyzed to determine if there is data for the balance type sought (e.g., MTD—month-to-date, YTD—year-to-date) (block 616).

Once rows and columns are identified, the data extraction module 302 uses the section identification module 314 to analyze the various rows to attempt to identify sections and sub-sections. In some embodiments, the section identification module 314 identifies sections and subsections using a data dictionary of words that match the expected sections/subsections for the source document. For example, if the expected source document is a balance sheet or an income statement, examples of expected sections and subsections are listed in FIG. 9. In this example, the expected sections for balance sheet are assets, total assets, and liabilities while current assets and other assets are subsections of assets. The example sections for an income statement in FIG. 9 are revenue, total revenue, sales expenses, total sales expenses, operating expenses, and total operating expenses. Accordingly, in this example, a library of synonyms for the words in FIG. 9 could be used to break up the document into sections, which can be used by a web interface to break up the document into visual sections for the user. By way of example only, the synonym for "current assets" could be "curr. assets" or "short-term assets." In some embodiments, a "total" line may be used to perform mathematical validation of a column (i.e., ensuring the line items extracted add up to the extracted total). For example, the section identification module 314 could request operator intervention (or otherwise log) in the event of a failure in validation to determine if there is a scan error or the submitted document's math is incorrect.

In some embodiments, the data extraction module 302 will present an interface to the user with the final rows of date to the user for processing, constituted by the label and relevant value. In some cases, the presentation includes a break out of the various statements (e.g., balance sheet, income statement, etc.) into sections/subsections. For example, the rows could be presented within the identified sections, but only those rows containing a label and numeric value.

In the embodiment shown, the extraction system 202 includes a client mapping module 304, which is configured to give meaning to the rows on the included pages of the source document. The client mapping module 304 includes a user interface, which could be an app or web portal, from which the users can give meaning to the rows on the included pages. For example, the user interface may be configured to mapping a line item (e.g. Label="Cash") to a client export template (i.e., the format desired for export). By way of example, the label of "Cash" could be used to map rows in pages to "Cash" in the client export template, which indicates that the given line item should be included in the balance for "Cash" that is exported. More than one line item may be mapped to a single export template line. By completing the mapping for each line (or marking it as "unmapped"), the client user establishes the meaning for each line and where to include its value in the final output. The final output to the customer as part of the integration file includes the client export template line items with their balances summed together based upon the "mapping" completed via the user interface of the client mapping module 304 (e.g., web user interface), which can be stored in the client mapping database 306.

FIG. 10 provides an example of mapping various rows with various labels to "Cash" in the export template. In this example, the source document lines for "Cash and cash equivalents" and "marketable securities" were mapped to "Cash" in the export template so the resulting line item for "Cash" is equal to the sum of the two mapped lines. After processing this document, the mapping actions taken by the user are stored in the client mapping database 306. The next time the document is submitted for a different time period, the extraction system 202 attempts to "replay" the mapping rules by matching the source document labels against the saved mapping action. Since "Marketable securities" at this general position in the document was mapped to "Cash" last time, it is automatically mapped to the same place again. In this way, most lines are mapped in the same way as when previously processed by the user. Only lines that are new or (label has) changed must be manually mapped by a user again.

Figure 4:
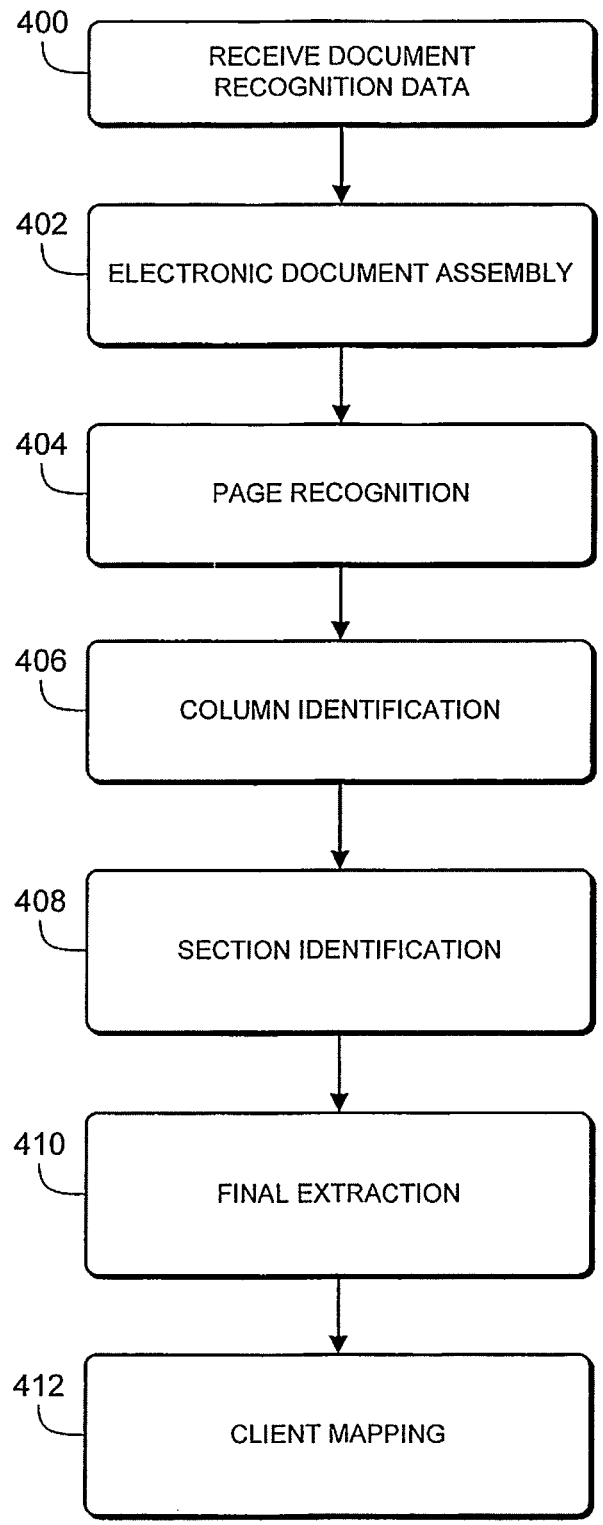
FIG. 4 is a flow chart showing example operations of the extraction system according to one embodiment.

FIG. 4 is a flow chart showing example operations that could be performed by the extraction system 202. In the embodiment shown, the extraction system 202 receives a document with recognition data from the recognition server 316 (Block 400). As discussed above the recognition data could be a document created by the recognition server from an OCR scan with location data (e.g., coordinates) regarding the position of characters on the document. The extraction system 202 will then assemble the characters into words, and the words into phrases through a document assembly process with the document assembly module 308 (Block 402). The document assembly process identifies distinct pages; likewise, the rows on the pages are identified. Upon completion of the document assembly (Block 402), the pages and rows of the document have been identified, but none of the data has been extracted for use. The extraction system 202 next performs page recognition with the page identification module 310 (Block 404). As discussed above with respect to FIGS. 5A and 5B, the page identification module 310 identifies the usefulness of the page. For example, the page identification module 310 could identify those pages that represent all or page of a Balance Sheet or Income Statement. The extraction system 202 then performs column identification (Block 406) using the column identification module 312, which determines if the column is a label column or a value column as discussed above with respect to FIG. 6. Upon identifying the rows and columns, the extraction system 202 attempts to identify sections and sub-sections of the various rows using the section identification module (314) (Block 408). The extraction system 202 then goes through a final extraction (Block 410). The final extraction presents the rows of data to a user for processing constituted by a label and relevant value. The presentation to the user breaks out various statements (e.g., balance sheet, income statement) into sections and sub-sections. The extraction system 202 allows the user to give meaning to the rows included in the pages through client mapping (Block 412). As discussed above, the client mapping establishes meaning for each line and where to include its value in the final output.

What is claimed is:

1. An apparatus comprising:
   a storage device; and
   at least one processor coupled to the storage device, wherein the storage device stores a program for controlling the at least one processor, and wherein the at least one processor, being operative with the program, is configured to:
      obtain document recognition data including positional locations of a plurality of characters in a non-standardized digital source document;
      identify at least a first column and a second column in the non-standardized digital source document by analyzing the positional locations of the plurality of characters in the document recognition data;

determine whether the first column is a label column or a value column;

determine whether the second column is a label column or a value column;

analyze the positional locations of the plurality of characters to identify a plurality of rows in the first column and the second column;

associate a plurality of predetermined variables with at least one expected word of a plurality of expected words;

correlate at least a portion of the plurality of rows in the label column with a variable of the predetermined plurality of variables based on a comparison of characters in the rows of the label column to determine if the characters in respective rows match at least one of the plurality of expected words and correlating that row with the variable to which the matching expected word is associated, wherein the plurality of expected words vary as a function of a document type of the non-standardized digital source document;

assign values to respective rows in the plurality of rows of the value column to variables associated with corresponding rows in the label column; and transmit the plurality of variables and respective plurality of values over a network.

2. The apparatus of claim 1, wherein the processor is configured to determine a type of document from a plurality of document types based on an analysis of the positional locations of the plurality of characters in the document recognition data.

3. The apparatus of claim 2, wherein the processor is configured to determine the type of document by analyzing characters with a positional value near a top of a page of the non-standardized digital source document.

4. The apparatus of claim 3, wherein the analysis of characters with a positional value near a top of a page of the non-standardized digital source document includes matching the characters for a plurality of predetermined words representing document types.

5. The apparatus of claim 4, wherein the processor is configured to determine the type of document by analyzing characters lower on the page of the non-standardized digital source document responsive to not finding a match of the plurality of predetermined words in characters with a positional value near a top a page of the non-standardized digital source document.

6. The apparatus of claim 5, wherein responsive to not finding a match of the plurality of predetermined words lower on the page of the non-standardized digital source document, the processor is configured to search the storage device to determine whether a user associated with the non-standardized digital source document has submitted a previous document.

7. The apparatus of claim 6, wherein the processor is configured to identify the type of document by comparing the non-standardized digital source document with the previous document responsive to not finding a match of the plurality of predetermined words lower on the page of the non-standardized digital source document.

8. A system for giving meaning to data in a non-standardized digital document, the system comprising:

a web portal accessible via a network for receiving a non-standardized digital source document;

a recognition server configured to perform optical character recognition analysis on the non-standardized digital source document, wherein the recognition server generates document recognition data including positional locations of a plurality of characters in the non-standardized digital source document; and an extraction system configured to identify labels and corresponding values represented in the non-standardized digital source document and automatically map the labels to a plurality of predetermined variables in an external software system to which the values from the non-standardized digital source document are to be imported, wherein the extraction system is configured to: (i) associate one or more of the plurality of predetermined variables in the external software system with one or more expected words of a plurality of expected words; (ii) map at least a portion of the plurality of predetermined variables with one or more of the plurality of rows in a label column as a function of rows in the label column matching one or more expected words of the plurality of expected words; (iii) assign values of respective rows in a plurality of rows of a value column to variables mapped with corresponding rows in the label column; and (iv) identify one or more rows in the label column for which there is no match with at least one of the plurality of expected words, wherein the plurality of expected words vary as a function of a document type of the non-standardized digital source document; and wherein the web portal is configured to receive user-adjustment of the plurality of expected words associated with one or more of the plurality of predetermined variables in an external software system.

9. The system of claim 8, wherein the extraction system is configured to identify at least a first column and a second column in the non-standardized digital source document by analyzing the positional locations of the plurality of characters in the document recognition data.

10. The system of claim 9, wherein the extraction system is configured to determine whether the first column or the second column is a label column.

11. The system of claim 10, wherein the extraction system is configured to determine whether the other of the first column or the second column is a value column.

12. The system of claim 11, wherein the extraction system is configured to analyze the positional locations of the plurality of characters to identify a plurality of rows in the first column and the second column.

13. One or more non-transitory, computer-readable storage media comprising a plurality of instructions that in response to being executed cause a computing device to:

obtain document recognition data including positional locations of a plurality of characters in a non-standardized digital source document;

identify at least a first column and a second column in the non-standardized digital source document by analyzing the positional locations of the plurality of characters in the document recognition data;

determine whether the first column is a label column or a value column;

determine whether the second column is a label column or a value column;

analyze the positional locations of the plurality of characters to identify a plurality of rows in the first column and the second column;

associate a plurality of predetermined variables with at least one expected word of a plurality of expected words;

correlate at least a portion of the plurality of rows in the label column with a variable of the predetermined plurality of variables based on a comparison of characters in the rows of the label column to determine if the characters in respective rows match at least one of the plurality of expected words and correlating that row with the variable to which the matching expected word is associated, wherein the plurality of expected words vary as a function of a document type of the non-standardized digital source document;

assign values to respective rows in the plurality of rows of the value column to variables associated with corresponding rows in the label column; and transmit the plurality of variables and respective plurality of values over a network.

14. The one or more non-transitory, computer-readable storage media of claim 13, further comprising instructions to identify one or more rows in the label column for which there is no match with at least one of the plurality of expected words.

15. The one or more non-transitory, computer-readable storage media of claim 13, further comprising instructions to add one or more expected words to the plurality of expected words in response to user input.

16. The one or more non-transitory, computer-readable storage media of claim 15, further comprising instructions to adjust one or more associations between one or more rows in the label column and one or more variables of the predetermined plurality of variables in response to user input.

* * * * *